3,172,722
PHOTOGRAPHIC SPEED MEASURING APPARATUS
Barry David Brown, Englewood Cliffs, N.J., assignor to American Foto Patrol, Inc., Guttenberg, N.J., a corporation of New York
Filed Feb. 27, 1961, Ser. No. 91,724
27 Claims. (Cl. 346—107)

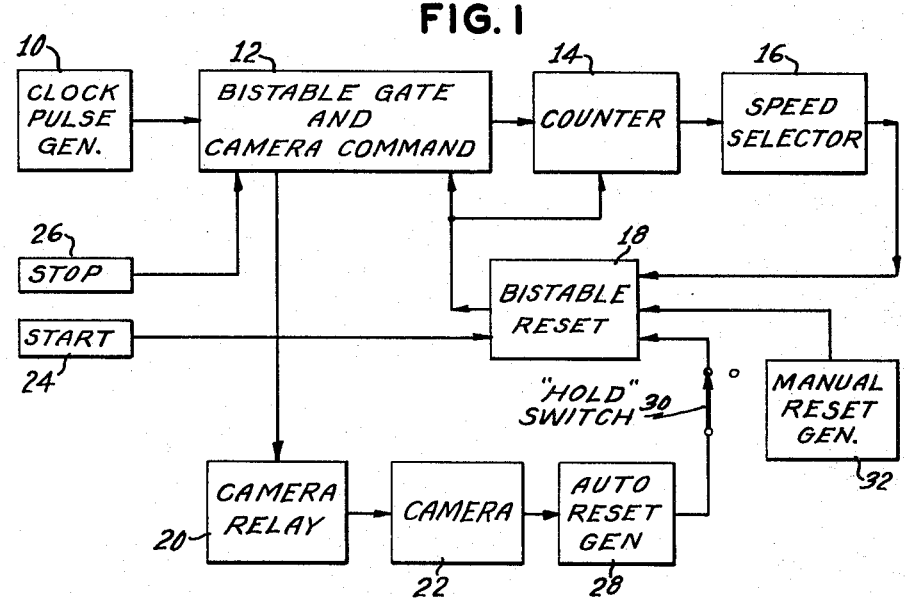

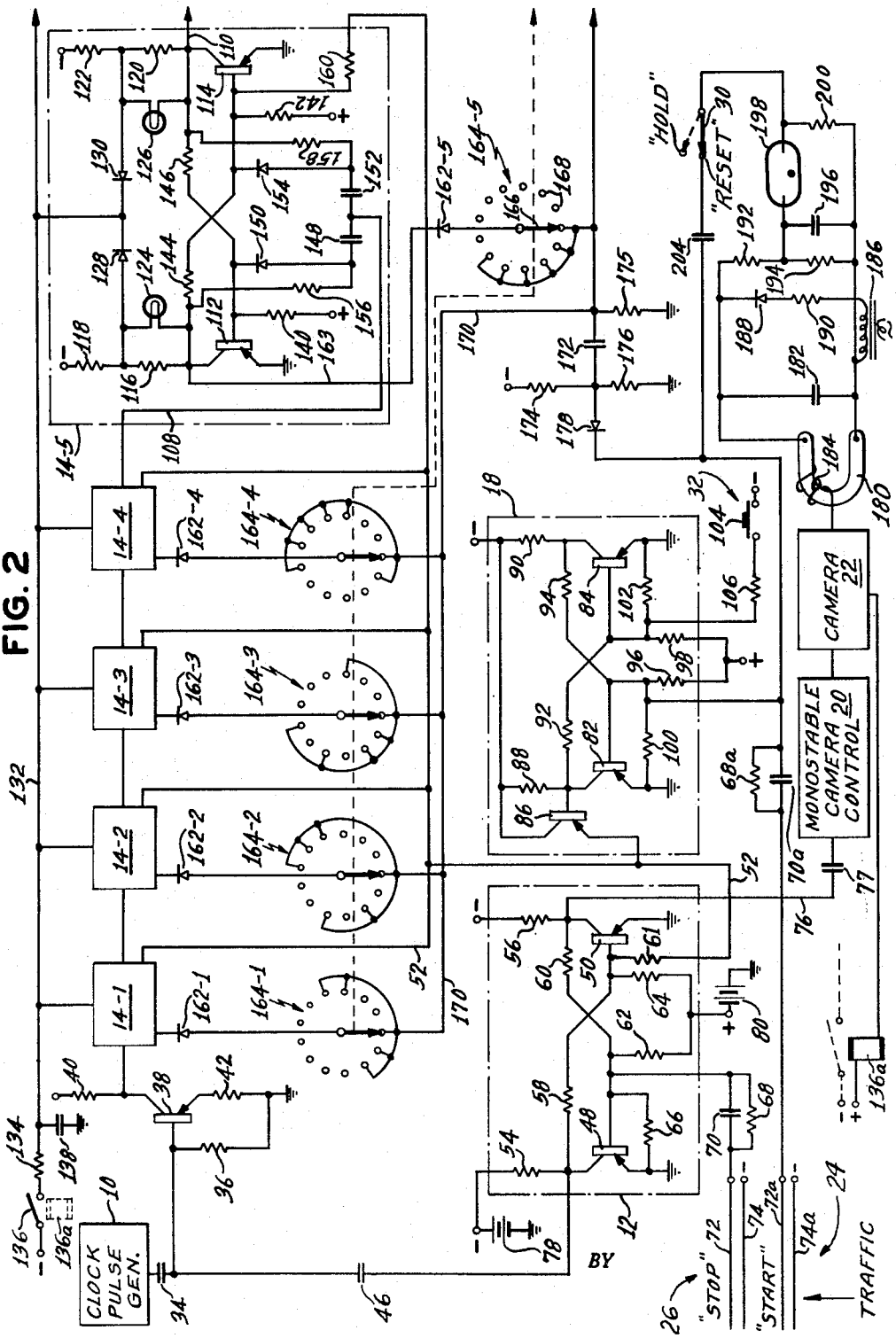

The present invention relates to speed measurement apparatus employing "start" and "stop" controls that are spaced apart by a known distance and actuated in succession for starting and stopping the counting of clock pulses; and the invention relates further to pulse counters.

In the illustrative embodiment of the invention which is described in detail below and shown in the accompanying drawings, accurately timed clock pulses are fed to a counter under control of "start" and "stop" pressure switches that are spaced apart along a traffic lane. When a vehicle actuates the pressure switches in succession, its speed is precisely related to the count that is registered in the counter, where the clock-pulse frequency is accurately known and the spacing between the "start" and "stop" switches is accurately established. The illustrative embodiment of the invention also includes a camera which is triggered to photograph vehicles that are detected as having passed the "start" and "stop" devices at speeds above a pre-set level. The described apparatus includes a read-out for the counter, which may be photographed together with the vehicle as a record of its speed.

The various features of the invention are improvements in such apparatus, although certain of the novel features have more general application. An object of this invention resides in certain novel features of the apparatus, enabling it to be set for retaining a speed measurement in the form of a reading of the counter while suppressing response of not only the counter but also the camera to subsequent actuations of the "start" and "stop" devices.

Such apparatus is to be portable, as a practical matter, and advantageously employs transistor circuits and low-voltage batteries. At the same time, the read-out part of the apparatus should have high intrinsic brightness, so as to be easily photographed and easily read despite high levels of ambient light. A further object of the invention resides in circuits for switching on the read-out lights; and a further feature of the invention relates to circuits for achieving counter stability when using incandescent lamps whose filaments tend to produce transient impulses during their brief warm-up times immediately after they are switched on.

At times it may be desirable to suppress operation of the camera for slow-moving traffic and to cause camera actuation in response only to vehicles travelling above a pre-set level. In terms of the counter, this means that camera operation is to be suppressed for all counts which exceed a predetermined number corresponding to a permissible maximum speed setting. An object of the invention in this connection resides in a simplification and improvement in counter circuits for detecting this pre-set count in the event that it should occur before the vehicle produces a "stop" control pulse.

The apparatus operates to photograph vehicles that exceed the speed corresponding to the pre-set number of counts in the controls associated with the counter. A discrete minimum exposure time is necessary for each photographic operation, needed particularly for photographing the read-out in which lamps of limited light output are used. In the case of incandescent lamps, a finite time is also involved in the warm-up of the filaments after they are switched "on" at the start of the photographic operation. In any event, the counter should not be reset during the photographic operation. Reset should occur after a suitable delay. A further object of the invention resides in a novel control circuit for effecting this reset. The novel reset circuit takes advantage of high-intensity flash apparatus that is used as an adjunct of the camera. By producing a reset impulse after the high intensity flash has been produced and its energy storage capacitor has been sufficiently recharged, assurance is had that the counter is not reset prematurely and, additionally, there is the assurance that the equipment is not put into operation before the high-intensity flash apparatus is ready for renewed operation.

The nature of the foregoing features of the invention is more fully explained below in connection with the detailed description of the illustrative embodiment which is shown in the accompanying drawings. From this detailed description, certain additional objects and features of novelty will become apparent. In the accompanying drawings:

FIG. 1 is a block diagram of an illustrative embodiment of certain features of the invention;

FIG. 2 is a wiring diagram showing internal details of the apparatus of FIG. 1; and FIG. 3 is a front view of a suitable form of read-out for the counter.

The novel illustrative photographic speed monitoring system is shown in FIG. 1 in block-diagram form. Clock pulses are provided continuously by clock-pulse generator 10, being approximately 2500 cycles per second in a practical example of this apparatus. These pulses are applied to bistable gate 12 which, when open, transmits the pulses to counter 14. Bistable gate 12 performs the additional function of controlling transmission of activating impulses to camera relay stage 20 for operating camera 22.

As will be seen, counter 14 is in the form of a simple sequence or cascade of bistable flip-flop stages so as to constitute an ordinary binary counter. With eight stages, the counter has a total count capacity of 255. Modifications of such counters involve well-known arrangements such as cascades of binary stages that are not arranged in simple sequence but are interconnected to provide cascaded binary-stage decades. These counters are characterized by feeding the clock pulse to the first stage of the cascade, through which pulses at half the clock-pulse frequency are relayed to other bistable stages of the sequence in the counter.

A speed-selector 16 is arranged to develop an output pulse when the number registered in the counter reaches a level corresponding to an authorized maximum speed. Selector 16 is a predetermined-count indicator or signalling device that produces an output pulse when the flip-flop counter stages first attain a predetermined combination of states. This pulse is transmitted to a bistable reset bias unit 18 and is used to turn "on" this reset stage.

Reset bias unit 18 has its input connected to receive pulses from speed selector switch 16 and its output is connected to each of the stages of counter 14 and to gate 12. There are three immediate effects that occur when reset bias generator 18 is turned on. First, it resets the binary stages in counter 14 by applying a sustained bias to the "0" side of each binary stage. Second, it opens the bistable gate 12 so that this gate is in condition for transmitting clock pulses from the clock-pulse generator 10 to the binary counter 14. That the clock pulses are transmitted to the counter at this time is of no consequence, so long as the reset stage is "on," inasmuch as the reset bias maintains the counter at its zero reading. Third, the sustained reset bias imposes a clamping or locking condition on gate 12 which disables the gate from transmitting a camera-activating impulse. Monostable multivibrator camera relay stage 20 is normally responsive to an impulse from gate 12 for initiating operation of camera 22. However, in the presence of reset bias from unit 18 on gate 12, no control pulse can be produced for camera relay 20.

The system shown is controlled by "start" device 24 and "stop" device 26. These may be simple pressure switches disposed in a roadway at a pre-assigned spacing along the traffic route. Vehicles travelling along this route operate "start" and "stop" units 24 and 26 in quick succession. The value registered in counter 14 represents the speed of the vehicle, provided that the counter is not reset by the operation of speed selector 16. Knowing the separation between the pressure switches 24 and 26, and knowing the exact frequency of the clock pulses, the significance of the count in counter 14 is readily converted in miles-per-hour. In a practical example, start and stop pressure switches are spaced apart exactly three feet so that at a vehicle speed of 60 miles-per-hour, there is a count of 85 with the clock-pulse frequency of 2500 cycles per second mentioned above.

It will be recalled that gate 12 was opened and clamped open by reset bias. In this clamped-open condition, the gate is insensitive or non-responsive to impulses from "stop" unit 26. Removal of reset bias allows the gate to stay open but terminates the clamped-open condition of the gate. It is then in condition to respond to "stop" unit 26.

A start impulse from unit 24 is transmitted to bistable reset unit 18 so as to discontinue the bias output of that stage. This removes bias from counter 14 which becomes instantly responsive to the pulses transmitted from clock-pulse generator 10 through gate 12 which is open at this time. After a brief time interval, depending upon the separation between the "start" and "stop" units 24 and 26 and upon the speed of the vehicle, "stop" unit 26 applies a control signal to bistable gate 12 so as to prevent further transmission of clock pulses to counter 14. At the same time, as an incident of the reversal of the bistable gate from "open" to blocking or "closed," an impulse is transmitted to the monostable camera relay stage 20 for operating camera 22. This response to the "stop" unit 26 occurs only if the "stop" pulse occurs prior to the counter 14 reaching the pre-set count of unit 16. If that were to occur before the "stop" pulse is produced, the gate is closed by reset bias and thus the gate is once again prevented from transmitting "stop" impulses from the "stop" unit to the camera control stage 20.

The system in FIG. 1 involves a number of significant properties.

When start unit 24 is first operated, the system is made effective to count subsequent impulses. It makes no difference how many times the start unit 24 is activated thereafter. It does not disturb the further operation of the system.

Presuming occurrence of a "stop" impulse before the predetermined count of unit 16 is reached, the very first operation of the stop unit 26 subsequent to a "start" impulse is effective to trigger the camera control stage 20, for causing picture-taking to follow and closing the gate to further transmission of clock pulses. A picture of the speeding vehicle may be taken, and the value in counter 14 is stored. This counter reading may also be recorded photographically, with suitable camera construction; and the count may also be displayed. Repeated operation of the "stop" unit, after its single gate-closing impulse is emitted, has no further effect.

It will be recognized that the counter retains its count condition prevailing at the instant of gate-closing by the "stop" unit 26, and that no "reset" operation should be expected by operation of speed selector 16. Consequently, the registered value in the counter can be stored indefinitely. Despite the condition of the counter as indicating detection of a speeder (having a stored count below the pre-set value of speed selector 16) subsequent operations of the "stop" unit 26 do not cause repeated camera operation.

The importance of this characteristic of the system will be appreciated from consideration of a practical application of the apparatus in checking the speeds of vehicles in traffic. When the equipment is set up and placed in operation, it is a customary practice of traffic officers to double-check the apparatus. This is done by reading an accurately calibrated speedometer in a patrol car driven across the "start" and "stop" pressure switches and comparing the speed represented by the count in counter 14 (converted to miles-per-hour) with the speedometer reading. That the count reading is retained (the reset operation at this time being delayed) is important in that the same traffic officer can read the speedometer in the patrol car and later he can compare the reading with the speed value stored in counter 14.

The patrol car is automatically photographed when travelling through the speed measurement zone identified by "start" and "stop" pressure switches 24 and 26. Thereafter, and until a reset operation occurs, the counter remains in condition representing detection of a speeder. Because of this condition of the counter, subsequent vehicles that actuate the "stop" switch 26 might cause repeated operation of the camera. The characteristic of the system of responding only to one "stop" impulse until "reset" occurs is thus a highly desirable attribute.

In FIG. 1, an automatic reset pulse generator 28 is provided, for actuating reset unit 18 automatically at the end of the picture-taking operation. Automatic turning-on of reset unit 18 may be suppressed, when desired, by opening "hold" switch 30. This is used in the above-described checking operation conducted by a traffic officer, to allow time for the same officer to read his speedometer as he drives past the "start" and "stop" devices 24 and 26 and then to read the value stored in counter 14. Manual reset pulse generator 32 is then used to operate reset unit 18 for resetting the system in readiness for the next cycle of operation. So long as this operation of the reset unit 18 is delayed, the "start" and the "stop" devices 24 and 26 are completely without effect either to cause camera operation or to disturb the stored count. Consequently, there is no response to repeated actuation of devices 24 and 26 by cars after an initial response by these devices to a test car operated by a police officer.

The apparatus of FIG. 1 is illustrated in greater detail in FIG. 2, in which a number of important additional features of the invention appear. In FIG. 2, clock pulse generator 10 is shown coupled to five flip-flop stages 14–1, 14–2, 14–3, 14–4 and 14–5 of the binary counter. Each of these stages delivers its output pulses to the next following stage and receives input pulses from the preceding stage, and each stage is in condition to respond to an input pulse from the preceding stage during the counting operation. The last stage 14–5 of the illustrated stages is coupled to a still further stage or stages, as may be appropriate for the required count capacity. The capaicty of the form of binary counter illustrated is equal to $2^n-1$, where $n$ is the number of stages in the counter. With eight stages mentioned in considering FIG. 1, a count capacity of 255 is available.

The gating circuit

Clock-pulse generator 10 is coupled through a controlled transmisison path to the multi-stage binary counter 14. This transmisison path is in the form of a pulse shaper, and includes a very small condenser 34 and a resistor 36 proportioned as a differentiating circuit to apply sharp-spiked pulses to transistor 38. The base of this transistor is connected to the junction of condenser 34 and resistor 36; and a resistor 40 is interposed between the negative terminal of a direct current supply and the collector of transistor 38. Resistor 42 is interposed between the emitter of transistor 38 and ground, and the resistor 36 also is grounded as shown.

Normally, transistor 38 has limited conduction, being a PNP transistor with a negative-collector supply and a self-biasing resistor 42. When negative voltage spikes are impressed on the transistor base, normal bias is momentarily overcome and positive squared output pulses of short duration are delivered to the input line of the first stage 14–1 of the binary counter.

Resistor 36 is shunted by a series circuit consisting of condenser 46 and the collector-emitter circuit of transistor 48. A companion transistor 50 acts with transistor 48 to form a flip-flop bistable gate. So long as transistor 48 remains switched off, it allows free pulse transmission from clock-pulse generator 10 to the counter. While transistor 48 is switched on, clock-pulse transmission is stopped, due to the low impedance presented by condenser 46 in series with switched-on transistor 48. Signals to transitsor 38 from small condenser 34 are by-passed to ground.

Transistors 48 and 50 have collector load resistors 54 and 56, respectively, extending to a negative supply terminal. Cross-coupling resistors 58 and 60 extend between the collector of transistor 48 and the base of transistor 50, and between the collector of transistor 50 and the base of transistor 48, respectively. Reset bus 52 is connected through current-limiting resistor 61 to the base of transistor 50. The base electrodes of transistors 48 and 50 have bias resistors 62 and 64 extending to a positive bias terminal. A further resistor 66 extends between the base and the emitter of transistor 48. In an example, resistors 58, 60 and 66 are all of equal resistance, resistors 54 and 56 are much smaller in value, and resistors 62 and 64 are of much larger resistance. Transistors 48 and 50 are the PNP type, as are all the other transistors shown in the drawing.

It will be appreciated that when transistor 50 is in its high conduction state, the junction of resistors 56 and 60 is very nearly at ground potential. Under the circumstances, the junction of resistors 60 and 66 is driven positive, by virtue of bias resistor 62. This junction is at the base of transistor 48 and the applied positive bias switches transistor 48 off.

The base of transistor 48 is connected to the "stop" device 26. As illustrated, this includes a resistor 68 and a condenser 70 connected in parallel, and these are connected to a pressure switch, including a pair of normally separated conductors 72 and 74. These conductors 72 and 74 may be disposed across a traffic lane to be pressed together by the wheels of the traffic to be supervised in the illustrative application of the invention.

When the entire apparatus is in condition awaiting the actuation of the "start" device mentioned in connection with FIG. 1, a strong negative bias is maintained on bus 52 and transistor 50 remains heavily conductive. Transistor 48 is consequently cut-off at this time, and the impedance in the network 46–48–54 which loads condenser 34 is consequently relatively high. Thus, the pulses from clock-pulse generator 10 are not by-passed but are transmitted by transistor 38 to the series of binary counter stages 14–1, etc. After the "start" device has been energized, the bias is removed from bus 52. Transistor 50, nevertheless, remains heavily conductive and the circuit including transistor 48, condenser 46, and transistor 38 all function as just described. Clock pulses transmitted to the counter are counted after removal of the reset bias, but the bistable gate remains "open" as it was prior to interruption of reset bias.

When conductors 72 and 74 of the "stop" device 26 are pressed into contact with one another, capacitor 70 is momentarily connected from the base of transistor 48 to the minus terminal. This has the effect of momentarily eliminating the bias of a few positive volts below ground which prevailed up to the time conductors 72 and 74 were pressed together. When this occurs, transistor 48 starts drawing current through its collector load resistor 54; the voltage at the junction of resistors 54 and 58 drops toward ground potential, and cut-off bias of a few positive volts below ground develops at the base of transistor 50, cutting off current through that transistor. The high-conductive state of transistor 48 represents an extremely low impedance in the series with condenser 46. As a result, the normal operation of condenser 34 and resistor 36 in developing negative-going spikes is completely upset so that there are no significant pulses applied to transistor 38.

A lead 76 extends from the collector of transistor 50 to monostable camera control unit 20, for operating this camera-control unit. The moment that transistor 48 becomes heavily conductive and drives transistor 50 into its blocked state, the collector of transistor 50 shifts abruptly in potential to a value that approaches that of the negative supply terminal. This negative-going impulse on line 76 is applied via condenser 77 to monostable camera control unit 20 for initiating a camera-operating cycle. By its design, unit 20 is responsive only to such negative-going pulses.

As previously described, the "start" device 24 is effective to interrupt the reset bias on bus 52. Thereafter, application of pressure to conductors 72 and 74 is effective to switch transistor 48 on, and to block transistor 50. This interrupts transmission of clock pulses from clock-pulse generator 10 to the counter 14; and it also causes transmission of a camera-control pulse via lead 76. The camera can be situated to photograph the vehicle whose front wheels are just passing the "stop" conductors 72 and 74, and the camera can also photograph the read-out of the counter, the count representing the speed of the vehicle.

Repeated actuations of the "start" device 24 does not have any effect on the reset apparatus, as will appear; and repeated actuations of the "stop" device are similarly of no effect in relation to the transistor 48 after it has once been switched on. Consequently, this system is effective to cause camera operation in response to a single cycle of actuation of the "start" and the "stop" devices and is completely insensitive to subsequent actuations of the "start" and "stop" devices until "reset" occurs. This feature is of particular importance, as explained in connection with FIG. 1, when the count in one cycle of operation is to be retained and yet the camera is not to respond to subsequent actuations of the "start" and "stop" devices.

The bistable circuit including transistors 48 and 50 is shown energized by two direct current supplies 78 and 80 which are connected to the negative terminal and to the positive terminal previously mentioned and to ground. These direct current supplies are utilized elsewhere in the circuit of FIG. 2 at terminals where plus and minus symbols appear.

The reset circuit

As seen in FIG. 2, the bistable reset circuit 18 includes three PNP transistors 82, 84 and 86. The collectors of transistors 82 and 84 have load resistors 88 and 90, respectively, and the collector of transistor 86 extends directly to the negative supply terminal. Resistors 92 and 94 are cross-coupled between the collector of transistor 82 and the base of transistor 84, and between the collector of transistor 84 and the bases of transistor 82, respectively.

Bias resistors 96 and 98 extend from the positive bias terminal to the base electrodes of transistors 82 and 84, respectively. Additionally, resistors 100 and 102 extend between the base terminal and the emitter of each of the transistors 82 and 84. The bias and cross-coupling resistors of the bistable reset unit 18 are connected in a manner similar to the resistors connected to transistors 48, 50 as previously described, and are similarly proportioned.

A manual reset-actuating circuit is shown including a switch 104 and a resistor 106, providing one way of effecting reset.

In its "off" condition, reset circuit 18 does not impress bias on bus 52, and in this condition transistor 82 is switched "on," transistor 84, is "off," and positive cut-off bias is imposed on the base of transistor 84. When switch 104 is closed, the base of transistor 84 is driven strongly negative relative to the grounded emitter, and transistor 84 is switched "on." This shifts the junction of resistors 90 and 94 close to ground potential. Positive bias appears at the junction of resistors 94, 96 and 100, and transistor 82 is switched "off." Switch 104 is closed momentarily, and when it is released or opened, the transistors 82 and 84 remain in their "off" and "on" conditions as described.

The base and the collector of transistor 86 are connected to the terminals of resistor 88. Reset bus 52 is connected to the emitter of transistor 86. The purpose of transistor 86 is to provide isolation between the low-impedance circuit of reset bus 52 and the relatively high impedance presented at the junction of resistors 88 and 92 and the collector of transistor 82. Transistor 86 is an emitter-follower, whose emitter is at all times maintained substantially at the potential of its base. Closing of switch 104 switches transistor 82 off and thereby drives the base of transistor 86 toward the potential of the negative supply. The net effect of this phase of the operation of the reset circuit 18 is to maintain bus 52 strongly negative. This bias is effective not only to maintain the bistable circuit of transistors 48 and 50 in "reset" state as described, but, by virtue of the other connections of reset bus 52 as shown, the various stages of the binary counter 14 are also maintained in a "reset" state.

"Start" device 24 includes a pair of conductors 72a and 74a in all respects like conductors 72 and 74 of the "stop" pressure switch described above. They are disposed across a traffic lane, and are pressed into mutual contact by vehicle wheels. A resistor 68a and a capacitor 70a are connected in parallel and they are interposed between conductor 72a and the base of transistor 82. When the reset circuit is "on," transistor 82 is "off" and its base has positive hold-off bias. Closing of pressure switch 72a–74a momentarily connects condenser 70a from the base of transistor 82 to the minus terminal. This switches transistor 82 "on" and switches transistor 84 "off." The strong negative bias on bus 52 is thus removed. The collector of transistor 82 is very near ground potential, as is the base of transistor 86, and the emitter of transistor 86 provides a low resistance path to ground in this condition. As will appear, this removal of "reset" bias allows the counterstages to respond to clock pulses. Actuation of the "start" device thus starts the pulse-counting operation and frees the bistable gating circuit of transistors 48 and 50 to respond to actuation of "stop" pressure switch 72, 74.

The binary counter

The internal detail of one of the binary counter stages is illustrated at the upper right-hand corner of FIG. 2, designated 14–5. This counter stage includes an input pulse line 108, an output pulse line 110, and a pair of transistors 112 and 114. The emitters of these transistors are grounded. The collector of transistor 112 includes two series-connected load resistors 116 and 118. The collector of transistor 114 similarly has two series-connected load resistors. Incandescent light-bulbs 124 and 126 are connected in parallel with resistors 116 and 120, respectively. A pair of diodes 128 and 130 extend from incandescent lamps 124 and 126, respectively, to a lamp-energizing bus 132. A resistor 134 and a single-pole switch 136 are connected between the negative supply terminal and bus 132, and a large capacitor 138 is connected between lamp-switching bus 132 and ground.

Resistors 140 and 142 are connected to the bases of transistors 112 and 114, respectively, and to the positive supply terminal for providing positive bias. Cross-coupling resistors 144 and 146 extend from the collector of transistor 112 to the base of transistor 114, and from the collector of transistor 114 to the base of transistor 112, respectively.

A circuit may be traced between pulse-input line 108 and the base of transistor 112 including a coupling condenser 148 in series with a diode 150 and another circuit from input line 108 extends to the base of transistor 114, including coupling condenser 152 in series with a diode 154. Resistor 156 is connected between coupling condenser 148 and the collector of transistor 112, and similarly, resistor 158 is connected between coupling condenser 152 and the collector of transistor 114.

The base of the transistor 114 has a connection through resistor 160 to reset bus 52. When the circuit is in its normal state, awaiting a "start" impulse, reset bus 52 maintains strong negative potential on the base of transistor 114, switching this transistor "on." Positive bias on the companion transistor 112 holds this transistor "off." The transistor in each of the binary stages 114–1, 114–2, etc. corresponding to transistor 114 is maintained in its high-conductive state by negative potential on this reset bus 52. When the reset bias is removed from the bus 52, the transistors all remain in the same states in which they were left, until input pulses change their condition.

Output line 110 of stage 114–5 is very nearly at ground potential when transistor 114 is "on." When it is changed to its "off" state, transistor 114 shifts the potential of output line 110 to a value very nearly that of the negative supply terminal, representing a strong negative shift. A like change occurs in stage 114–4, when that stage receives its first input pulse, providing a strong negative-going impulse on input line 108 of stage 114–5. Such negative-going pulses have no effect on counter stage 114–5, nor on any of the other stages.

If it is considered that transistor 114 is in its "off" condition and is then switched "on," its output line 110 will shift abruptly from a potential close to the negative supply terminal to very nearly ground potential, a strong positive shift. A negative output pulse is delivered upon reverse change, when transistor 114 changes from "on" to "off." By like token, when the corresponding transistor in counter stage 14—4 shifts from its switched-off to its switched-on condition, it delivers a strong positive impulse to line 108, and negative impulses are delivered upon each reverse change.

A posiitve impulse is coupled by condenser 148 and diode 150 in its forward-conducting polarity, to the base of transistor 112, and it is also coupled by condenser 152 and diode 154 to the base of transistor 114. Such positive impulse has no effect on a transistor which, at that moment, is in its switched-off state. However, it switches off the transistor which is "on" at that instant. By virtue of the cross-coupling network described, the companion transistor is switched on.

For each positive impulse on line 108, one change occurs in the states of transistors 112 and 114, and for each pair of positive impulses at input line 108, only one positive impulse is developed at output line 110. Similarly, a count of 2 pulses to stage 14–1 will result in one positive impulse being delivered to stage 14–2. A count of 4 impulses to counter stage 14–1 will deliver one positive impulse to stage 14–3. Each stage accounts for a count capacity of 2; and the binary counter includes a simple sequence of binary stages. Combinations of such flip-flop binary stages are similarly known, to provide decades in one common variation of the simple sequence of binary stages.

In the described apparatus, it is important for the gate to be open when counting is to start. However, because of considerations discussed above, the "start" device is not allowed to start the counting operation by opening the gate. If the "start" device opened the gate, it would correspondingly condition the gate to respond to the "stop" device, with (at times) undesired operations of the camera ensuing. The count in the counter is to be stored for a long period of time under some conditions; and so long as it is stored, the gate is disabled by subjecting the gate to "reset" control. Unlike usual practice with binary counters, the thus-conditioned gate is not used in the circuit described to start the counting operation. The gate is open actually before counting is to start. Counting is started by removal of sustained reset bias applied to one side of each bistable flip-flop counter stage. In addition to providing desirable operating characteristics in the system, this arrangement achieves the substantial circuit economy.

*Counter read-out*

Lamps 124 and 126 have been described as incandescent lamps and, in a practical application, are pilot lights. The power supplies 78 and 80 can be limited to 12 volts, and the incandescent lamps can be turned on bright when needed, using only 12 volt batteries as power supplies. The light output of incandescent lamps can greatly exceed neon pilot-lamp brightness and the operating voltage can be much lower than is required for neon lamp operation.

Resistors 116 and 120 which are in parallel with incandescent lamps 124 and 126, are of a high value of resistance compared to that of a filament. Resistors 118 and 122 are in series with the lamps. These resistors are of a high value relative to the resistance of the lamp filaments, so that with the corresponding transistor "on," the lamp filament is not lit. Because of the relative resistances of the lamps and resistors 118 and 122, variations in lamp resistance in the collector circuits is inconsequential, and counter stability is protected. Resistors 116 and 120 are about equal to resistors 118 and 122 in a practical embodiment.

The collector current of transistor 114, when "on," is carried partly by resistor 120 and partly by the filament of lamp 126. By restricting the lamp current to a value well below normal, the variations in lamp resistance are curtailed. By including additional constant resistance components as loads, the thermal resistance transient variations are curtailed as a dominant factor. It has been found, as a matter of practical experience, that the thermal inertia of the filaments and the change of resistance incident to the change in current carried by first one lamp and then the other of each counter stage does not interfere with the stable operation of any of the binary counter stages during counting.

The purpose of the lamps is to provide read-out indication of the counter at the time that counting of the clock-pulses is interrupted by actuation of the "stop" device. The lamps connected to the "on" transistors are switched to full brightness for this read-out operation. This is accomplished by closing the single switch 136, which functions for all of the stages of the binary counter. It may be assumed, for example, that transistor 112 is switched on at the time that a read-out indication is desired. When this occurs, the collector of transistor 112 is very nearly at ground potential and the collector of transistor 114 is very nearly at the potential of the negative supply terminal to which switch 136 is connected. Closure of switch 136 is effective to impose the full potential of the negative supply on a circuit consisting of diode 128 in its forward-conduction direction, in series with lamp 124 shunted by resistor 116, and transistor 112 in its switched-on highly conductive state. Closure of the switch 136 has no effect on the corresponding circuit including lamp 126 inasmuch as the collector of transistor 114 at this time is very nearly at the potential of the negative supply terminal. Lamp 124 which previously had no more than a feeble glow before switch closure is converted to bright illumination. The switching circuit by-passes resistor 118 insofar as lamp 124 is concerned. Diodes 128 and 130 provide isolation between the collector load resistance circuits of the two transistors 112 and 114 during the counting operations, when switch 136 is open.

The achievement of lamp switching for all of the counter stages by means of the single, simple switch 136 is of considerable importance. Any more complex circuit involving multiple switches with multiple contact pairs would be more complicated in respect to the circuit wiring and in respect to the complexity of the switch. Moreover, it would involve a reduced order of reliability, where reliability is a factor of critical concern.

The foregoing lamp-switching circuit, which turns on the lamps corresponding to the switched-on transistors of the various stages, can be made to operate for a given set of conditions without difficulty. However, if a wide range of different operating temperatures is to be taken into account (as it must be in some applications) then another important factor enters the picture. When lamp 124 (for example) is changed from either its cold condition or from its dull-glow condition to a bright "on" condition by operation of switch 136, a negative pulse is developed at the base of transistor 114, that is, the transistor base suddenly becomes more negative. Depending upon the degree of saturation involved in transistor operation at the particular operating temperature, the pulse may be substantial. This pulse or spike is at its peak at the instant that the increased current flows through the lamp filament. The spike gradually decays as the resistance of the lamp filament rises with time, due to increased filament temperature and resistance, as the filament heats up to incandescent brightness. Under marginal design conditions and under conditions prevailing under extreme temperatures, this spike might cause the state of one or more of the flip-flop binary counter stages to flip or reverse, thereby displaying an erroneous count reading.

This troublesome condition is avoided by means of the filter represented by resistor 134 and capacitor 138. Resistor 134 carries the combined currents of one lamp in each of the counter stages when read-out illumination occurs, and resistor 134 is quite small, approximately seven ohms in one example. Correspondingly, the capacitance of capacitor 138 is quite large, 500 microfarads for example. By virtue of this filter, the foregoing spurious pulses related to the warm-up characteristics of incandescent read-out lamps are effectively eliminated. When switch 136 is initially closed, the potential on bus 132 does not instantly rise but its potential rise is delayed by the drop in resistor 134 due to the charging current of capacitor 138. While capacitor 138 is becoming charged, the lamps that are to become bright have reached that condition. The objectionable spike during the warm-up time of the lamps which might cause spurious reversal of one or more of the counter stages is thus eliminated, for practical purposes.

In FIG. 3, there appear two rows of squares, an upper row in which each square contains a zero, and a lower row in which the successive squares contain numerals 1 to 8, respectively. FIG. 3 is the front view of an actual read-out, to display the count in a binary counter of eight-stages. Each square is a translucent member, bearing the numeral shown. An incandescent pilot lamp is mounted behind each of these translucent squares, corresponding to incandescent lamps 124, 126, etc. Thus, lamp 126 in the fifth stage (FIG. 2) is mounted behind the square bearing the numeral 5, and lamp 124 is mounted behind the square bearing "0" directly above numeral 5. In each of the stages, one or the other of the pilot lights would be "on," and the other would be "off." In FIG. 3, this is indicated by the shading of one square of each pair of squares, one lamp being off and its square being dark, while the other is on and its square is bright. The numerals in the darkened squares are shown in broken lines.

The significance of the counter is derived from the combination of illuminated squares bearing the numerals 1 to 8. The other series of squares bearing zeros provides assurance that all of the lamps which should be on are actually "on," and that any darkened square does not cover a lamp whose filament has burned out. One square of each vertical pair of squares is lit during read-out times, while the companion square is dark.

In FIG. 3, numerals 8, 7, 4, 2 and 1 are "on." If it is understood that numeral 1 represents the side of binary stage 14–1 that is "on" under "reset" conditions and that the remainder of the squares bear numerals corresponding to the "on" sides of the other counter stages 14–2, 14–3, etc., then the read-out value "8–7–4–2–1" signifies a count of 52. This may be understood from the following: if the zero above the numeral 1 were "on," that represents a count of one. If the zero above numeral 2 were "on," that represents a count of two. Correspondingly, if the zeros above numerals 3, 4, 5, 6, 7 and 8 were on, those would separately represent counts of 4, 8, 16, 32, 64 and 128. By adding the numbers corresponding to the illuminated zeros (or corresponding to the numbers of the darkened squaes) the reading of the binary counter can be interpreted. However for speed in use of the apparatus, the meaning of each possible combination of "on" and "off" numerals 1 to 8 can be tabulated. Accordingly, with the squares bearing numerals 3, 5 and 6 darkened in the example illustrated, the value in the counter is readily found to be 52, either by the process of addition or by reference to the table.

Where the "start" and the "stop" pressure switches are installed in a roadway for measuring vehicle speeds, the distance between the pressure switches being fixed at a standardized distance, and where the clock-pulse frequency is accurately known, then the count in the counter following each sequence of "start" and "stop" actuations can readily be converted to miles-per-hour. In the above tabulation of counter readings, this can be converted to miles-per-hour thus:

| Reading | Count | Miles-per-hour |
|---|---|---|
| 8-7-4-2-1 | 52 | (x) |

The value of $x$ is computed from the distance between the start and stop pressure switches, and from the clock-pulse frequency.

*Automatic reset circuit*

It is sometimes desirable to restrict operation of the camera to only those vehicles exceeding a predetermined speed. For example, it may be desirable to disregard all vehicles traveling along a particular road whose speed is below 40 miles per hour, and to photograph all those vehices which exceed 40 miles per hour. This is achieved by means of a circuit that provides an output pulse for resetting the "reset" unit 18 when a predetermined count has been reached.

This reset-control circuit includes a series of diodes 162–1, 162–2, 162–3, etc., plus corresponding mechanically ganged selector switches 164–1, 164–2 . . . 164–5, etc., there being one diode 162 and one selector switch 164 for each binary counter stage. In stage 14–5, diode 162–5 is connected by lead 163 to the collector of transistor 112. The diode is polarized so as to be forward-conducting in response to large values of negative potential at the collector of transistor 112. Diode 162–5 is connected to the moving contact arm 166 of selector switch 164–5 and to a selected one of the stationary contacts 168 of this selector switch. Certain contacts 168 are connected to a reset-control bus 170. The stationary contacts 168 of each selector switch 164 may be designated "1," "2," etc., starting with the lowermost contact (shown engaged by the moving contact arm 166) and progressing clockwise. Only certain of the stationary contacts of all the switches 164 are connected to this "reset" control bus 170. The moving contact arms of the five selector switches illustrated are in the "1" positions, in contact with the lowermost stationary contact illustrated, and each such lowermost contact is connected to the reset control bus 170. At times when the binary counter is reset to zero, transistor 112 of stage 114–5 and the corresponding transistors of the other stages are all switched off and consequently leads 163 are all at a high negative potential. After the start of a counting operation, transistor 112 or the corresponding transistor in one or more of the other counter stages may be switched "on" so that its lead 163 drops very near to ground potential. There is little consequence to such occurrence, so long as transistor 112 or a corresponding transistor in at least one of the other counter stages remains switched "off." Any one transistor that is "off" is effective to apply strong negative bias via its diode 162 and its switch 164 to reset control bus 170, provided that the switch is connected to reset bus 170 in the selected position of the switch. The negative bias on bus 170 does not disturb the counters whose transistors 112 or corresponding transistors have been switched "on" and whose collectors are correspondingly very close to ground potential because diodes 162–1, 162–2 . . . 162–5, etc. block such reverse current flow from the reset control bus 170 to such transistors.

Reset control bus 170 is connected to a ground return resistor 175, and has a connection via coupling condenser 172 to the top of a voltage divider consisting of resistors 174 and 176. This voltage divider is connected between ground and the negative direct-current supply terminal. Diode 178 extends from the top of the voltage divider to the base of transistor 82 in "reset" unit 18. In the "off" condition of the reset stage, diode 178 is biased by voltage divider 174, 176 so as to provide for transmission of only large positive pulses from coupling condenser 172.

Small positive pulses develop on bus 170 when switch 136 closes and turns "on" one or more of the lamps 124. In the "off" condition of the reset stage, diode 178 is biased to prevent transmission of such small pulses to the reset stage and thus guards against the possible operation of the "reset" stage in response to small positive pulses which develop on bus 170. Such pulses do develop when one or more lamps 124 are turned "on," at which time a reset operation is most undesirable.

It will be observed that some of the stationary contacts of switches 164–1, 162–2, etc., are connected to reset control bus 170 while no connection is provided to the other stationary contacts. Thus, for example, if all of these selector switches are indexed three steps clockwise, it will be seen that switches 164–1, 164–2, 164–3 and 164–4 have their selector arms on "dead" stationary contacts and that the stationary contact of selector switch 164–5 is connected to reset control bus 170. With this switch setting, reset bus 170 is maintained at the potential of the collector of transistor 112 during the initial series of clock pulses. Diode 162–5 is forward-conducting and impresses this potential across resistor 174. This assumed setting of switch 164, which is speed selector 16 in FIG. 1, represents a "preset count" of "16" in a counter consisting of only the stages shown. The count registered in stages 14–1, 14–2, 14–3 and 14–4 continues to rise until the capacity of fifteen counts has been reached. When the sixteenth clock pulse is applied to the input stage, a control pulse on input line 108 of stage 14–5 causes both transistors of that stage to reverse or "flip." Transistor 112 is switched "on," its collector drops virtually to ground potential, and the negative bias on reset control bus 170 and across resistor 175 disappears. Consequently, coupling condenser 172 transmits a large positive impulse via diode 178 to the base of "reset" transistor 82. It will be recalled that, in order to start the counting operation just described, it was necessary to remove the strong negative reset potential of bus 52, meaning that transistor 82 was switched "on" to establish the "off" condition of the reset stage. The large positive impulse from diode 178 switches transistor 82 "off" and thereby restores reset bias to reset bus 52. This restores the binary counter stages to zero, and it also restores holding bias to the base of transistor 50. The bistable circuit including transistors 48 and 50, which was previously rendered sensitive to actuation of "stop" pressure switch 72, 74 is rendered insensitive by this "reset" bias.

A vehicle which passes the "start" pressure switch 72a starts the counting operation. If it travels at an extremely slow speed, it does not reach "stop" pressure switch 72, 74 before the automatic reset circuit occurs. As described above, the resetting operation blocks the bistable gate. When the "stop" pressure switch is next actuated by the same (or another) vehicle after such resetting operation, that "stop" actuation has no effect.

The foregoing describes how "automatic reset" occurs when a slow-moving vehicle actuates the "start" device but does not actuate the "stop" device before the number of clock pulses registered in the counter reaches the number for which preset count switch 164 is set.

Vehicles travelling at excessive speed start the counting of clock pulses by passing "start" pressure switch 72a, 74a and then reach "stop" pressure switch 72, 74 before the number of pulses to the counter reaches the value for which switches 164–1, 164–2, etc. are set. Bistable gate 12 including transistors 48, 50 responds to "stop" switch 72, 74, interrupting further transmission of clock pulses to the counter and effecting a single operation of the camera control unit 20.

Each of the positions of selector switches 164–1, 164–2, 164–3, etc. will have a different combination of connections to bus 170, for establishing different minimum-count or minimum-speed settings of the equipment. Thus, if these switches are all set at the second step clockwise from the positions shown, then diodes 162–1, 162–3 and 162–5 will be connected through the selector switches to the reset control bus 170, leaving diodes 162–2 and 162–4 disconnected from the reset bus. With this setting, and assuming that there are no other binary stages to be considered except those illustrated, the negative bias on reset control bus 170 will disappear as soon as counter stages 14–1, 14–3, and 14–5 have all shifted from their "reset" or zero condition. With the switch setting assumed, this requires a count of 21 pulses. With this switch setting, it is not only necessary for a count of 16 to be reached in order for stage 14–5 to be changed from its zero setting as effected by "reset" bias initially, but it is also necessary for an additional five counts to be registered in order that stages 14–1 and 14–3 shall reach the necessary state concurrently for negative bias to disappear from reset control bus 170. As soon as this occurs, a positive control pulse is transmitted to the base of transistor 82 for "flipping" reset unit 18 as previously described.

Such a positive control pulse is transmitted as soon as the negative bias disappears from reset bus 170. With the assumed switch setting that produced a reset pulse when the count of 21 was reached, reset actually occurred. Hypothetically, if the counting operation were to proceed for two more pulses, counter stage 14–2 would have reversed its condition and the counter would contain 23 counts. Under such hypothetical condition, the reset bus 170 would still (or again) have no negative bias and the conditions for generation of a reset pulse would again be satisfied. However, this situation is academic. The reset pulse is produced as soon as a count is reached which first satisfies the setting of the selector switches. By providing only those connections to the selector switches which couple the reset control bus 170 to the significant counter stages corresponding to the count involved, a considerable simplification can be obtained in the circuit wiring. The significant stages are those which have all been switched for the first time to a combination of states which satisfies the desired minimum-count setting of the switches. It makes no difference that there are other counts, larger in value, that may also satisfy the circuit conditions set up by the selector switches. In predetermined-count indicators known heretofore, "predetermined count indication" has evidently been confused with "unique count indication," and as a result there has been considerable needless circuit complexity in known predetermined counter indicators.

Switches 164 have thirteen stationary-contact positions. In the setting shown, the reset-control pulse produced by reset control bus 170 will occur only when the full count capacity of the counter has been reached, 255 for an 8-stage binary counter. The other switch positions may be assigned count numbers that correspond to respective permissible speed levels, as 25, 30, 35, 40 miles per hour, etc. With such switch settings, vehicles travelling across the "start" and "stop" pressure switches 24 and 26 below any such speed setting will not be photographed and the counter will be automatically reset for the next vehicle.

*Camera operation and hold circuit*

In cases where the "stop" pressure switch is actuated before the count registered in the counter reaches the preset count setting of switch 164, gate 48, 50 interrupts further transmission of pulses to the binary counter stages and the registered count is stored. Additionally, a pulse is transmitted by the gate to the monostable camera control unit 20 for operating camera 22 to take a picture of the vehicle and of the read-out (FIG. 3).

As part of the picture-taking operation, in order to provide adequate illumination of the vehicle and to "stop" its motion as viewed on film, a high-intensity gaseous-discharge flash or strobe bulb 180 is used. Energy-storage capacitor 182 is connected to the terminals of flash bulb 180, and is charged to a high voltage. A discharge occurs when an impulse, synchronized with the shutter of the camera, is applied to trigger electrode 184 of the flash bulb. This type of bulb involves a glass tube containing a mixture of rare gases under pressure, and trigger electrode 184 is usually a wire wrapped around the glass tube. A high-voltage transformer 186 supplies charging current through rectifier 188 after each flash occurs, so that the capacitor will be fully charged upon next actuation of the camera. A resistor 190 restricts the peak value of the charging current to a safe, practical level. This resistance plus the resistance associated with power transformer 186 cause a time-delay in the operation of charging the capacitor. Charging may take, for example, one-half second. At the conclusion of this time interval, the photographic recording operation has been completed, the strobe bulb is again ready for the next operation, and both the counter and the bistable gate may be reset, in condition for a new cycle of operation.

In order to effect "reset" following camera operation, the following circuit is provided. A voltage divider including resistors 192 and 194 are connected in parallel with capacitor 182. A small condenser 196 is connected across resistor 194, and a small neon lamp 198 such as is used commonly as a panel or pilot light is connected in series with resistor 200 across condenser 196. The junction of neon bulb 198 and resistor 200 is connected via normally closed switch 30 and coupling condenser 204 to the base of transistor 82.

After a picture has been taken and condenser 182 is discharged as a result of flash-tube operation, recharging commences immediately. The voltage across voltage divider 192, 194 rises until the breakdown potential of the neon lamp 198 is reached. When this occurs, a discharge occurs through lamp 198 and develops a positive pulse across resistor 200. This is transmitted via switch 30 and condenser 204 to the base of transistor 82 of the reset unit 18. Such a positive impulse causes a reverse "flip" of bistable reset circuit 18, restoring reset bias to bus 52. Condenser 196 suppresses spurious sharp spikes that are sometimes developed in neon tube operation.

In the foregoing manner, reset occurs automatically at the conclusion of each picture-taking operation. At times it is desirable to suppress such automatic reset, in order that the count in the counter may be preserved for inspection following a picture-taking operation. This is accomplished by opening switch 30 and thereby suppressing transmission of a reset pulse. Until reset occurs, the count registered in the counter is stored, and the "start" and "stop" devices 24 and 26 remain insensitive to subsequent vehicles. After inspection of the read-out, reset may be effected by depressing manual reset switch 104. In order to restore the automatic reset circuit to operation, switch 30 is returned to the position shown in the drawing.

So long as the reset unit 18 has not been actuated to apply bias to reset bus 52, it is desirable that neither the camera nor the counter shall respond to successive operation of the "start" and "stop" devices. This is a characteristic of the system, as has been described in detail above.

It has been indicated above that certain read-out lights, selected by the counter stages, are turned on when the camera is operated to take a picture of the read-out of FIG. 3 and of the vehicle. It has also been indicated that the camera is electrically controlled by control unit 20. When "camera relay" unit 20 of FIG. 1 is built as a monostable multivibrator, for example, it changes from its normal condition to its unstable condition in response to an impulse from unit 12. Camera control unit 20 remains in its unstable condition for a predetermined time interval and then returns automatically to its normal condition. It is during that time interval (1/30 second, for example) that the camera is operated, to record the illuminated pattern of the read-out. For this purpose, the camera may include a shutter that is opened by an electromagnet and allowed to remain open so long as the electromagnet continues to be energized. The time interval is made long enough for the lamp filaments to become bright and for the read-out image to be recorded on film. Contacts 136 in the drawing are operated by relay coil 136a either concurrently with camera operation under control of the "camera relay" unit 20 or under control of part of the camera such as the shutter itself, as may be preferred.

In connection with the above description relating to switch 30, it has been indicated that there are times when the count stored in the counter is to be displayed on the read-out for inspection rather than for recording by the camera. In the example discussed, a police officer may want to compare the reading of the equipment with the reading of his calibrated speedometer after a test run. Switch 30 is then set to its "hold" or reset-suppressing position. In automatic operation that follows such a test run, the read-out lamps are switched on and off by relay 136a in timed relation with camera operation. A push-button switch 206 is provided for subsequently turning on the lamps of the read-out. Switch 206 serves to energize relay coil 136a and thereby causes the selected read-out lamps to light. Of course switch 206 may be connected directly in parallel with switch contacts 136 for the same purpose.

The read-out in FIG. 3 and the form of counter in FIG. 2 have two read-out sides for each stage. There are lamps for each side of each stage, an arrangement that provides assurance that a lamp that is not lit under any one of the numbers "1" through "8" is truly off and is not burned out. This is because the companion "0" area is lit when such lamp of any "1" to "8" area is out.

If any vertical pair of areas in FIG. 3 were dark, it follows that a lamp is burned out or defectively connected. A similar (if less rigorous) assurance can be provided for this purpose without resort to lamps connected as shown. Thus, the "0" areas may be omitted from the read-out of FIG. 3 and instead the lamps associated with the "0" areas may be connected in parallel, respectively, with the lamps of the "1" to "8" areas. The parallel-connected pairs of lamps may be mounted closely adjacent each other so that each pair of lamps jointly illuminates an individual read-out area. With that construction, if a lamp is out because of being burned out, its companion lamp will still light the read-out area. If the foregoing safeguard were not deemed worthwhile, only one lamp might be used under each read-out area "1" to "8" and the lamps under the "0" read-out areas might be omitted entirely. In that event only a single read-out lamp per stage would be used. Under such circumstances the counter stages shown, having two switching transistors per stage, could be replaced by known forms of bistable counter stages having only one switching device per stage. Bistable stages having only one PNPN switching device per stage are well known and if used could have but a single read-out lamp per stage. It will be understood, accordingly, that the term "bistable" stage includes not only circuits having two switching devices, but also circuits that contain but a single switching device.

The foregoing illustrative embodiment of the various novel features of the invention are naturally susceptible to modification, rearrangement, and varied application in other apparatus, such as would occur to those skilled in the art. It is therefore appropriate that the invention should be construed broadly in accordance with its full spirit and scope.

What is claimed is:

1. Apparatus of the type described, having a counter, clock-pulse supply means, control means for supplying pulses from said supply means to said counter or terminating the supply of pulses to the counter, a "stop" means having a control connection to said control means operative to shift the latter into its pulse-terminating condition, reset means connected to said counter and effective to reset said counter, a "start" device having a control connection to said control means, said control connection including said reset means and being arranged to be controlled by said reset means to render said control means effective to supply pulses to the counter, and selectively operable means to disable said reset means both from resetting said counter and from responding to said "start" device.

2. Apparatus in accordance with claim 1, further including a camera controlled by said control means and operable thereby in response to the change of the control means into its pulse-terminating condition, said "start" device and said "stop" means being disposed in spaced sequence along a traffic lane for successive actuation by a vehicle, and said camera being disposed in position to photograph a vehicle following actuation of said "stop" means and in response to said change of said control means into its pulse-terminating condition.

3. Apparatus of the type described, having a counter, clock-pulse supply means, "start" and "stop" devices, control means for coupling pulses from said supply means to said counter, said control means being responsive to said "stop" means for terminating the supply of clock pulses from said clock pulse supply means to said counter, reset means having an idle condition and having a reset condition in which it is effective to hold the counter in its reset condition, and means controlled by said "start" device including counter reset means for shifting said reset means into its idle condition and thereby initiating counter operation and for rendering said terminating means responsive to said "stop" device.

4. Apparatus of the type described, having a counter, means for supplying clock pulses to the counter, bistable means effective in one state for interrupting the supply of clock pulses to said counter, a "stop" device to switch said bistable means to said one state from its other state, reset means for holding said counter at zero and for holding said bistable means in said other state despite actuation of said "stop" device, and a "start" device having a control connection to said reset means for releasing said counter and said bistable means.

5. Apparatus in accordance with claim 4, further including selective means optionally operable for suppressing response of said reset means to said "start" means.

6. Apparatus of the type described, having a counter, means for supplying clock pulses to the counter, bistable means effective in one state for interrupting the supply of clock pulses to said counter, a "stop" device to switch said bistable means to said one state from its other state, reset means for holding said counter at zero and for holding said bistable means in said other state despite actuation of said "stop" device, a "start" device having a control connection to said reset means for releasing said counter and said bistable means, a camera, and control means responsive only to the change of said bistable means from said other state into said one state for actuating said camera.

7. Apparatus of the type described, having a counter, means for supplying clock pulses to the counter, bistable means effective in one state for interrupting the supply of clock pulses to said counter, a "stop" device to switch said bistable means to said one state from its other state, reset means for holding said counter at zero and for holding said bistable means in said other state despite actuation of said "stop" device, a "start" device having a control connection to said reset means for releasing said counter and said bistable means, a camera, and control means responsive only to the change of said bistable means from said other state for actuating said camera into said one state, said reset means including a reset-disabling control for rendering said "start" device, said control means and said "stop" device ineffective in relation to said camera so long as said reset means is prevented from resetting said counter.

8. Apparatus of the type described having a counter, means for supplying clock pulses to said counter, "start" and "stop" devices, reset means normally effective for holding the counter at zero, bistable means having a control connection from said "stop" device and operable thereby into one state effective to interrupt pulse supply by clock-pulse supplying means, said reset means having a control connection to said bistable means for holding said bistable means in the condition in which it is operated by said "stop" device while said reset means is in condition to hold the counter at zero, and a control connection from said "start" device to said reset means for terminating the control of the reset means over the counter and over the bistable means.

9. Apparatus of the type described having a counter, means for supplying clock pulses to said counter, "start" and "stop" devices, reset means normally effective for holding the counter at zero, bistable means having a control connection from said "stop" device and operable thereby into one state effective to interrupt pulse supply by clock-pulse supplying means, said reset means having a control connection to said bistable means for holding said bistable means in the condition in which it is operated by said "stop" device while said reset means is in condition to hold the counter at zero, a control connection from said "start" device to said reset means for terminating the control of the reset means over the counter and over the bistable means, a camera, and control means coupled to said bistable means and responsive only to changes of the latter into said one state for actuating said camera.

10. Pulse counting apparatus, including a counter, means for supplying clock pulses to the counter, bistable means effective in one state for interrupting the supply of clock pulses to said counter, a "stop" device to switch said bistable means to said one state from its other state, reset means for holding said counter at zero and for holding said bistable means in said other state, a "start" device coupled to said reset means and effective to terminate the reset condition thereof and thereby to release the counter to respond to supplied pulses and to release said bistable means to respond to said "stop" device, and control means for the reset means operable selectively to keep the reset means in its counter-resetting condition or to return the reset means to its reset condition in which it is responsive to said "start" device.

11. Apparatus of the type described, including a series of bistable stages interconnected at least in part as a binary counter, "start" and "stop" devices, clock-pulse supply means controlled by the "stop" device for delivering pulses to said counter until interrupted, bistable reset means having a direct-current biasing connection to each counter stage and operative when turned on to return and maintain the counter at zero, said reset means having a control connection from the "start" device and said "start" device being arranged to turn the reset bias off.

12. Apparatus of the type described, including a series of bistable stages interconnected at least in part as a binary counter, "start" and "stop" devices, clock-pulse supply means controlled by the "stop" device for delivering pulses to said counter until interrupted, bistable reset means having a direct-current biasing connection to each counter stage and operative when turned on to return and maintain the counter at zero, said reset means having a control connection from the "start" device and said "start" device being arranged to turn the reset bias off, said reset means having a direct-current connection to said clock-pulse supply means for applying control bias thereto so long as said counter is maintained at zero.

13. Pulse counting apparatus, including a pulse supply, a pulse counter having an input point coupled to said supply and including an interconnected series of bistable stages, each of said stages including a companion pair of switching devices one of which is "on" when the other is "off," incandescent indicator lamps for each side of each of said stages, switching means for connecting said lamps between a common electric power supply terminal and the respective switching devices of said stages, and coordinating control means for said pulse supply and said lamp switching means arranged to maintain said lamp switching means open so long as pulses from said pulse supply are fed to said counter.

14. Apparatus in accordance with claim 13, wherein said coordinating means includes gating means between said pulse supply and said pulse counter, and "start" and "stop" devices controlling said gating means.

15. Pulse counting apparatus, including a pulse supply, a pulse counter having an input point coupled to said supply and including an interconnected series of bistable stages, each of said stages including a companion pair of switching devices one of which is "on" when the other is "off," incandescent indicator lamps for each side of each of said stages, switching means for connecting said lamps between a common electric power supply terminal and the respective switching devices of said stages, and coordinating means for said pulse supply means and said lamp switching means arranged to interrupt the supply of pulses to said counter and to cause said lamp switching means to close.

16. A counter including a series of flip-flop stages interconnected as a pulse counter, each stage having a pair of switching devices one of which is "off" when its companion device is "on," incandescent read-out lamps for each side of the respective stages, means for interrupting the counting operation and switching means coordinated with said interrupting means for effectively connecting said lamps to said devices, respectively, only when said counter is at rest.

17. A counter including a series of bistable stages interconnected as a pulse counter and each including a switching device of the solid-state type having a load resistor connected to a direct-current supply terminal, a respective read-out lamp having a terminal connected to each said solid-state switching device, switching means connected between all of said lamps and said direct-current supply terminal, and means controlling both said counter and said switching means for closing said switching means only at times when the value registered in said counter is constant.

18. A counter including a series of bistable stages interconnected as a pulse counter and each including a switching device of the solid-state type having a load resistor connected to a direct-current supply terminal, a respective read-out lamp having a terminal connected to said switching device, switching means connected between said lamps and said direct-current supply terminal, and a filter including a series impedance and a shunt condenser in the circuit between said direct-current supply terminal and said read-out lamps.

19. A counter having a series of interconnected bistable stages each having a switching device, and respective read-out lamps for said devices, a switch having one terminal connected to a direct-current supply terminal and the companion terminal being connected to all said lamps, and a respective diode connected in series with each lamp between said switch and the respective switching devices.

20. A counter having a series of interconnected bistable stages each having a switching device, and respective read-out lamps connected to said switching devices, a common switch for connecting said lamps to a direct-current supply terminal, a series impedance element in the current path from said supply terminal to said lamps, and a shunting condenser connected to said impedance element at the side thereof remote from said direct current supply terminal.

21. A counter having a series of interconnected bistable stages each of which has a pair of switching devices, one of which is "on" when the other is "off" and each having an output point that is cross-coupled to the companion switching device to produce bistable operation, read-out lamps connected respectively to the output points of said stages, a switch having one terminal connected to a direct-current supply terminal and the opposite terminal of the switch being connected to said lamps, and a diode interposed in the respective lamp circuits between each of said switching devices and said other terminal of said switch.

22. A counter having a series of interconnected bistable stages each of which has a pair of switching devices, one of which is "on" when the other is "off" and each having an output point that is cross-coupled to the companion switching device to produce bistable operation, read-out lamps connected respectively to the output points of said stages, a switch having one terminal connected to a direct-current supply terminal and the opposite terminal of the switch being connected to said lamps, and a common filter delaying the rise of the lamp currents when the switch is closed, including a series resistor and a shunt condenser on that side of the resistor that is nearer to said lamps.

23. Vehicle-speed evidencing means including "start" and "stop" devices disposed along a traffic lane for successive actuation by a vehicle, clock-pulse supply means having a control circuit controlled by said stop device for terminating the supply of pulses, a pulse counter having control means connected to said "start" device for initiating pulse-counting by the counter, a camera having control means coordinated with termination of pulse supply to the counter, an electronic flash apparatus synchronized with the camera, said flash apparatus having an energizing capacitor and a charging circuit therefor, and a reset circuit for said counter, said reset circuit having an input connection from said flash apparatus and responsive to the recharge potential of the capacitor following a flash operation.

24. Apparatus in accordance with claim 23, wherein said reset-control circuit includes a gas-discharge device, a voltage divider connected to said capacitor and having a portion thereof connected to said reset-control circuit, the latter being coupled to said reset circuit for actuating the latter after a time interval needed by the capacitor to become recharged to a predetermined degree following operation of the camera and the flash apparatus.

25. Vehicle-speed measuring apparatus including a pulse counter, a clock pulse source, "start" and "stop" devices, means responsive to said "start" and "stop" devices for controlling response of said counter to said pulse source, said controlling means including reset means for restoring said counter to zero and for rendering the controlling means responsive to renewed actuation of said "start" device, and a predetermined count indicator, said counter including a cascade of stages at least some of which are interconnected as a binary counter, and said predetermined count indicator including a gauged group of selector switches, each having an input connection to only a single output point in each of said counter stages, said selector switches having different combinations of connections representing different numbers of predetermined pulse counts in the different selective positions of the switches, and said predetermined count indicator having a coincidence detecting means and being effective to cause operation of said reset means the first time that coincidence occurs among the output points of all the counter stages connected to the coincidence detecting means in the selected position of the switch, irrespective of whether such coincidence may or may not recur at some higher number registered in the counter.

26. A predetermined count indicator, including an input pulse source, a cascade of bistable stages connected to each other as a counter and at least some of which are connected to each other as a binary counter, and a coincidence circuit having a common output point and a selector switch for each stage of the counter, said selector switches being mechanically ganged and having multiple predetermined count-representing positions, there being only one selector switch for each said binary stage and each said selector switch in each of said positions either providing no connection or providing a connection to only a single output point of the respective counter stage, the combinations of said connections and omissions of such connections provided by the switches in their various selected positions representing various predetermined counts first attained by the counter after starting at zero, said coincidence circuit providing an output signal when the counter first reaches the count represented by the connections of the selector switches at the selected position of the ganged switches, and utilization means responsive to said output signal.

27. A counter including a series of bistable stages interconnected as a pulse counter, incandescent readout lamps for said counter, means for interrupting the counting operation, switching means for effectively connecting or disconnecting the lamps to said bistable stages, and coordinating means for controlling said switching means and said interrupting means so that said lamps are connected to said counter only when the counter is idle.

References Cited by the Examiner

UNITED STATES PATENTS

| | | | |
|---|---|---|---|
| 2,091,357 | 8/37 | Goldsmith | 346—14 |
| 2,181,728 | 11/39 | Greentree | 235—92 |
| 2,239,894 | 4/41 | Keen | 324—70 |
| 2,251,250 | 7/41 | Keen | 324—70 |
| 2,318,450 | 5/43 | Belock | 250—214 |
| 2,351,707 | 6/44 | Rouprich | 324—70 |

(Other references on following page)

UNITED STATES PATENTS

| | | | |
|---|---|---|---|
| 2,410,156 | 10/46 | Flory | 58—26 |
| 2,497,541 | 2/50 | Ferrara | 250—206 |
| 2,615,127 | 10/52 | Edwards | 328—110 |
| 2,619,402 | 11/52 | McCutcheon | 346—107 |
| 2,683,071 | 7/54 | Pearle | 346—107 |
| 2,851,596 | 9/58 | Hilton | 328—48 |
| 2,866,935 | 12/58 | Robillard | 324—102 |
| 2,927,836 | 3/60 | Shore | 346—107 |
| 2,927,837 | 3/60 | Martin | 346—107 |
| 2,954,462 | 9/60 | Utt et al. | 246—1 |
| 2,958,179 | 11/60 | Wolfe et al. | 58—24 |
| 2,970,226 | 1/61 | Skelton et al. | 307—88.5 |
| 2,996,578 | 8/61 | Andrews | 178—70 |
| 3,010,651 | 11/61 | Hempel | 235—92 |
| 3,011,122 | 11/61 | McKenna | 324—68 |
| 3,024,414 | 3/62 | Nordqvist | 324—70 |
| 3,032,766 | 5/62 | Weaver | 346—107 |
| 3,060,434 | 10/62 | Biedermann et al. | 346—107 |

LEYLAND M. MARTIN, *Primary Examiner.*
JOHN P. WILDMAN, *Examiner.*